United States Patent [19]

Koyanagi et al.

[11] Patent Number: 4,535,329
[45] Date of Patent: Aug. 13, 1985

[54] CONSTANT CURRENT/CONSTANT VOLTAGE DRIVE FOR AN ELECTROCHROMIC DISPLAY CELL

[75] Inventors: Katubumi Koyanagi; Hiroshi Take, both of Tenri; Hisashi Uede, Yamatokoriyama, all of Japan

[73] Assignee: Sharp Kabushiki Kaisha, Osaka, Japan

[21] Appl. No.: 524,111

[22] Filed: Aug. 18, 1983

Related U.S. Application Data

[63] Continuation of Ser. No. 370,154, Apr. 21, 1982, abandoned, which is a continuation of Ser. No. 915,003, Jun. 13, 1978, abandoned.

[30] Foreign Application Priority Data

Jun. 14, 1977 [JP] Japan ................................. 52-70838
Jun. 16, 1977 [JP] Japan ................................. 52-71714

[51] Int. Cl.³ .............................................. G09G 3/34
[52] U.S. Cl. .................................. 340/785; 340/811; 340/812; 340/357

[58] Field of Search ............... 340/785, 763, 811, 812; 350/357, 363

[56] References Cited

U.S. PATENT DOCUMENTS 3,987,433 10/1976 Kennedy .............................. 350/357
4,057,739 11/1977 Otake .................................. 350/357
4,201,984 5/1980 Inami et al. ......................... 340/812

OTHER PUBLICATIONS

*Electrochromic Display Devices;* Bruinink; pp. 201-218, Proceedings of 4th Brown-Boveri Symposium; 9/75.

*Primary Examiner*—Marshall M. Curtis
*Attorney, Agent, or Firm*—Birch, Stewart, Kolasch & Birch

[57] ABSTRACT

For an electro-optical display cell which manifests the electrochromic phenomenon to place the cell into the colored state or bleached state in response to current supplied, a constant current driving technique is carried through in the color (write) mode and a constant voltage is carried through in the bleach (erase) mode.

2 Claims, 10 Drawing Figures

CONSTANT CURRENT/CONSTANT VOLTAGE DRIVE FOR AN ELECTROCHROMIC DISPLAY CELL

This application is a continuation of application Ser. No. 370,154, filed Apr. 21, 1982, now abandoned, which is a continuation of Ser. No. 915,003, filed June 13, 1978, now abandoned.

BACKGROUND OF THE INVENTION

The present invention relates to a driving technique for an electro-optical display containing an electrochromic material held in two electrode carrying support plates to manifest reversible variations in the light absorption properties upon current supplied.

It is an object of the present invention to provide an improved driving technique for an electrochromic display which is capable of enhancing legibility of a visual display provided by the electrochromic display with simplified cell construction and simplified driver circuit.

BRIEF DESCRIPTION OF THE DRAWINGS

Other objects and novel features of the present invention are set forth in the appended claims and the present invention as to its organization and its mode of operation will best be understood from a consideration of the following detailed description of the preferred embodiments taken in connection with the accompanying drawings, wherein:

DETAILED DESCRIPTION OF THE INVENTION

Figure 1:
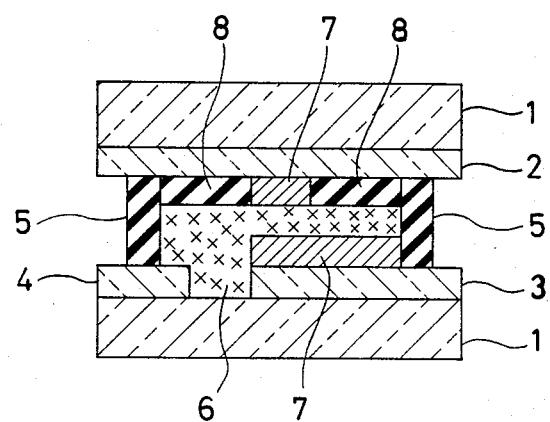
FIG. 1 is a cross sectional view of a basic structure of a solid state ECD.

An electrochromic material is one in which the color is changed by the application of an electric field or current. See, for example, L. A. Goodman, "Passive Liquid Displays", RCA Report 613258. There are two types of electrochromic display referred to as ECDs. In one kind, the color variation is produced by a change in the opacity of an inorganic solid film. A typical device structure is shown in FIG. 1, wherein a transparent insulating substrate is denoted as 1; a display electrode is denoted as 2; a counter electrode is denoted as 3; a reference electrode is denoted as 4; a spacer is denoted as 5; an electrolyte is denoted as 6; an electrochromic film is denoted as 7; and an insulating film is denoted as 8. In the illustrated example, the electrochromic material is deposited on the counter electrode. The inorganic film 7 commonly used for electrocoloration is tungsten oxide ($WO_3$) and molybdenum oxide ($MoO_3$) with a thickness of approximately 1 $\mu$m. The electrolyte 6 is a mixture of sulfuric acid, organic alcohol such as glycerol, and fine white powder such as $TiO_2$. The alcohol is added to dilute the acid and the pigment is used to provide a white reflective background for the coloration phenomenon. The thickness of the liquid is usually about 1 mm. The back electrode is properly selected for effective operation of the device.

The amorphous $WO_3$ film is colored blue when current flows from the counter electrode 3 to the display electrode 2, with the degree of coloring proportional to the amplitude of flowing charge. The blue color is diminished or bleached when the polarity of the applied voltage is reversed. This is termed bleaching.

The coloration of the film apparently is produced by the injection of electrons from the transparent electrode and hydrogen ions (protons) form the electrolyte. Bleaching occurs because the electrons and protons are returned to their respective starting electrons when the polarity is removed. The color will remain for several days even after the color voltage is removed (the memory effect).

The second type of ECD utilizes an electrically-induced chemical reduction of a colorless liquid to produce a colored, insoluble film on the cathode surface. In the absence of oxygen, the colored film remains unchanged as long as no current flows. However, the coloration will disappear gradually in the presence of oxygen. This is termed fading. Reversing the voltage causes the film to dissolve into the liquid with the concurrent erasure of the color. The colorless liquid that met with the most success so far is an aqueous solution of the conducting salt, KBr. and an organic material, heptylviologen bromide, which is the material that produces a purplish film upon electrochromic reduction. Typical voltages are about 1.0 VDC.

Figure 2:
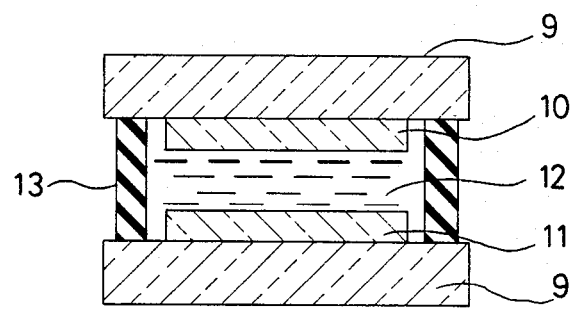
FIG. 2 is a cross sectional view of a basic structure of a liquid state ECD.

The basic cell structure is illustrated in FIG. 2. A glass substrate is denoted as 9; a back or counter electrode is denoted as 10; display electrodes are denoted as 11, a viologen mixture liquid is denoted as 12; and a spacer is denoted as 13. The fluid thickness is normally about 1 mm thick. The viologen-based ECDs can be used in a transmissive mode if both electrodes are transparent or in a reflective mode if a white reflective substrate is mixed in with the clear electrochromic liquid.

Although the operating principle of ECDs has been discussed above, ECDs have the following characteristic features;

(1) the viewing angle is extremely wide
(2) contrast is very high and is independent from the viewing angle
(3) low voltage drive (below several volts)
(4) memory effects are expected, which maintains the coloration state for several hours through several days after the removal of the coloration voltage
(5) the coloration degree is determined by the charge amount flowing through a cell
(6) energy consumption is proportional to the area for display and the number of the repeated coloration-bleaching cycles.

The ECDs are desirable for a display means of a portable electronic apparatus because they operate at a low voltage generated from a power cell.

Generally, there are three types of driving methods for ECDs. That is, the ECD is driven in a method either one of the constant potential type, the constant current type and the constant voltage type.

(1) CONSTANT POTENTIAL DRIVE

FIG. 2 shows a typical driver circuit of the constant potential type. In the constant potential type, the voltage applied to the counter electrode 3 is controlled so that a voltage difference between the display electrode 2 and the reference electrode 4 is maintained at a predetermined value U. When the display electrode 2 is held at a potential lower than that of the reference electrode 4 by more than a predetermined value, or a threshold level $E_{th}$, the coloration operation is conducted. Contrarily, when the display electrode 2 is held at a potential higher than that of the reference electrode 4 by more than the threshold level $E_{th}$, the display electrode 2 is bleached.

In the driver circuit of FIG. 2, the display electrodes are selectively connected to the ground potential. Therefore, when the predetermined value U is selected at a positive value, the display electrode potential becomes lower than the reference electrode potential. The driver circuit of FIG. 2 includes a linear amplifier 14 and segment selection switches 15.

Although only one segment selection switch 12 is illustrated in FIG. 2, the segment selection switches 12 are provided for each of the segment electrode 2 in order to properly select the display electrodes or the segment electrodes.

Figure 3:
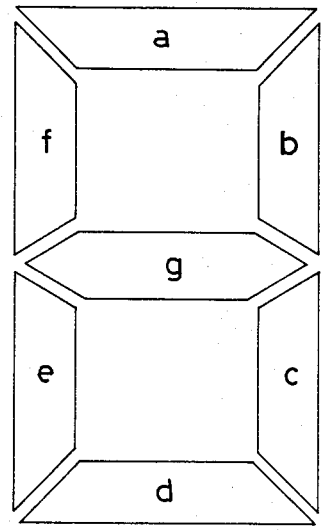
FIG. 3(a) is a layout of a typical seven-segment numeral display pattern.
FIG. 3(b) is a time chart.
Figure 3:
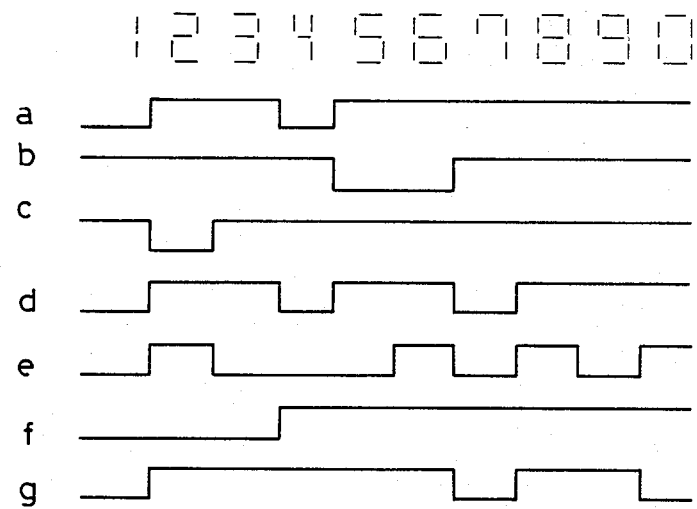
Figure 4:
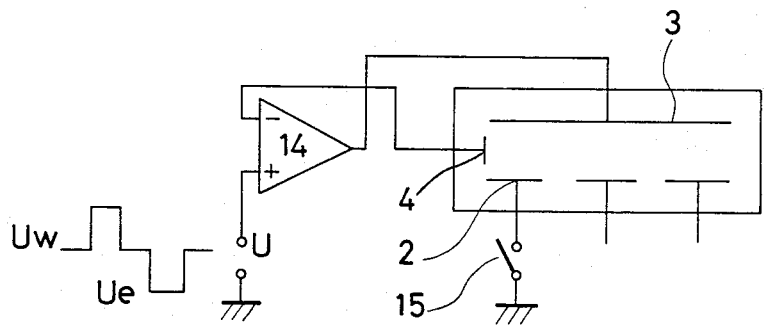
FIG. 4 is a basic circuit diagram of a constant potential ECD driver.

FIG. 3(a) shows a layout of a typical seven-segment numeral display pattern, FIG. 3(b) shows display conditions of numerals 1 through 0, and signal waveforms applied to the respective display electrodes of FIG. 3(a).

The coloring and bleaching modes are accomplished by closing desired ones of the segment selection switches. As long as the segment selection switches are opened, these segments are held in the memory state as they are, without any influence of other segments when energized. Although this technique makes it possible to equate the coloring degrees among the segments while keeping the potential difference between the two interfaces, it needs the third kind of electrode, namely, the reference electrode and the linear amplifier with accompanying complexity in cell structure and circuit construction.

(2) CONSTANT CURRENT DRIVE

Figure 5:
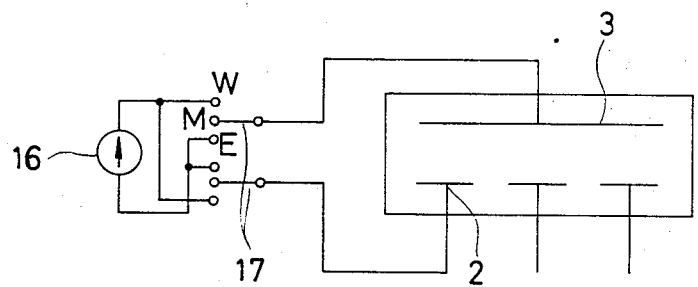
FIG. 5 is a basic circuit diagram of a constant current ECD driver.

FIG. 5 shows a typical driver circuit of the constant current type, which mainly comprises a constant current source 16. A write/erase switch 17 is provided and opened when it is desired to place the segment electrodes 2 in the memory state. The terminals W are for the coloration operation, the terminals E are for the bleaching operation, and the terminals M are for the memory function.

The constant current drive has the advantage that the coloration degree can be set at a desired value by proper selection of the amplitude of charge flowing. More particularly, the coloration degree can be maintained constant when the resistance of an electrode lead region presents a severe problem with voltage drop or when the characteristics of the electrochromic material vary from cell to cell. It is also possible to supply constant current despite variations in the ambient temperature. However, if there is a slight difference between the charge amplitude in the write mode and that in the erase mode, such an error will be increasingly accumulated for the repeated write-erase cycles and the reaction will be therefore biased in one direction. In the case where the charge amplitude in the write mode is greater than that in the erase mode, the coloring operation will be much encouraged and complete erasure will become almost impossible. Contrarily, when the charge amplitude in the write mode is smaller, current will keep flowing after the erasure and cause such undesirable side reactions as decomposition of the electrolyte and degradation of the respective electrodes.

(3) CONSTANT VOLTAGE DRIVE

Figure 6:
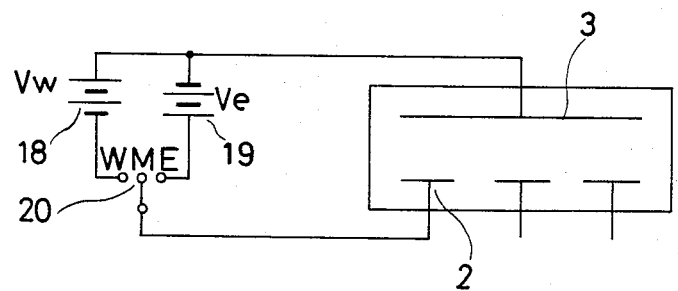
FIG. 6 is a basic circuit diagram of a constant voltage ECD driver.

FIG. 6 shows a typical driver circuit of the constant voltage type, which mainly comprises a coloration constant voltage source 18, a bleaching constant voltage source 19, and a selection switch 20. This technique offers circuit simplicity much as compared with the above discussed two drive techniques and shows the highest efficiency of energy utilization. The constant voltage drive is thus desirable to battery-powered low power dissipation apparatus.

Voltage is applied effectively to the interface with the display electrode in the erase mode because of the nature of the tungsten oxide film which shows a high resistance in the erase mode. This eliminates the necessity for a voltage high enough to cause the undesirable side-reactions and enables erasure with a high response speed. However in the color mode, the voltage drop appearing at the interface with the counter electrode provides the adverse effects which cause variations in the potential difference at the interface with the selected ones of display electrodes. The coloring degree of the respective segments varies each time the total area for a visual display changes, thereby degrading legibility of a visual display.

Although the advantages and disadvantages of the respective drive manners have been discussed, according to the present invention, the constant current drive is carried through in the write mode and the constant voltage drive is carried through in the erase mode. The present invention takes advantages of the merits of both drive techniques while keeping down the demerits of both drive techniques. In other words, the present invention avoids complexity in cell structure and drive implementation due to the third electrode and the analog linear amplifier, variations in the coloring degree, and the undesirable side reactions while in the erase mode.

Figure 7:
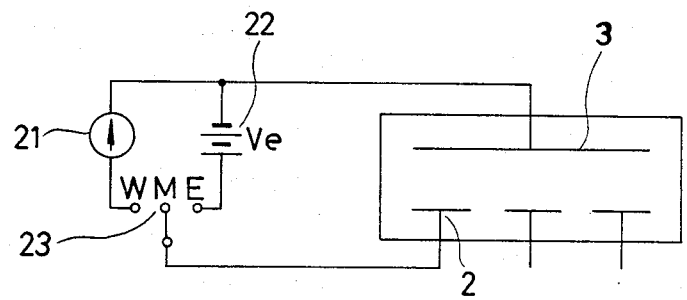
FIG. 7 is a basic circuit diagram of an ECD driver embodying the present invention.

In FIG. 7 a basic drive circuit of the present invention is shown, which includes a write/erase selection switch 23. The selection switch 23 is turned toward a constant current source 21 in the write mode and turned toward a constant voltage source 22 in the erase mode. The memory state is kept when the switch 23 is open. In FIG. 7 W denotes a write terminal, M denotes a memory terminal and E denotes an erase terminal.

Figure 8:
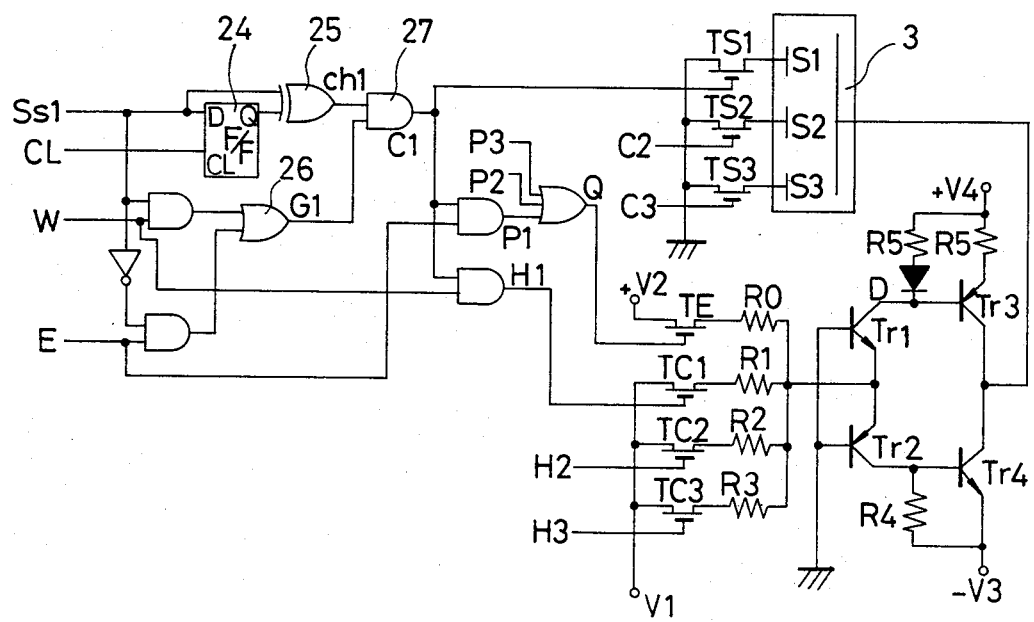
FIG. 8 is a practical circuit diagram of an ECD driver embodying the present invention.
Figure 9:
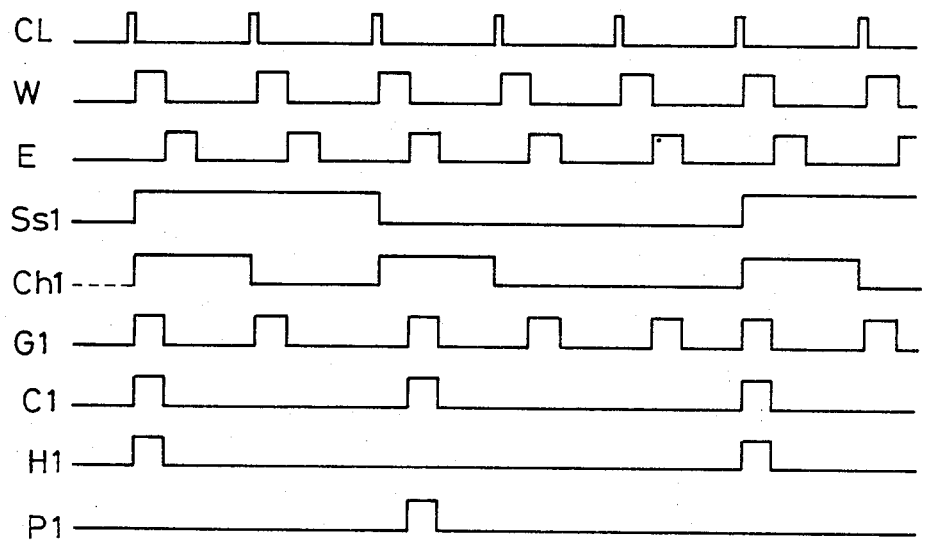
FIG. 9 is a time chart showing various signals occurring within the circuit of FIG. 8.

FIGS. 8 and 9 are a circuit diagram and a time chart of one preferred form of the present invention. FIG. 8 shows three segments for illustration only, wherein 3 denotes the counter electrode, $S_1$ to $S_3$ denotes the segment electrodes, $T_{S1}$ to $T_{s3}$ denote segment selection analog switches, $T_{C1}$ to $T_{C3}$ denote write current value selection switches, $T_E$ denotes an erase switch, $R_0$ to $R_3$ denote resistors, $T_{r1}$ to $T_{r4}$ denote transistors, D and $R_5$ denote a diode and a resistor both provided for suppressing variations in the characteristics of the transistor $T_{r3}$ when operating within the active regios, $R_4$ denotes a resistor, CL denotes a clock signal for a D type flip flop 24, W denotes a coloring timing signal, E denotes a bleaching timing signal, $S_{s1}$ denotes a segment signal having a high level specifying the colored state of the segment $S_1$ and a low level specifying the bleached state thereof, and $-V_1, -V_3, +V_2, +V_4$ denote power sources. These signals CL, W and E are common to all the segments. A change in the display pattern occurs at the trailing edge of the clock signals CL. The period of the change is equal to or an integral multiple of the period of the clock signals CL.

The circuit of FIG. 8 will operate in the following manner. A variation in the segment signal is evaluated by an exclusive OR logic 25 which also receives the Q output of a D type flip flop 24. The segment signal assumes a high level only for the period of CL, which is named $Ch_1$. The signal $Ch_1$ remains at a low level as long as no variation is sensed. The coloring timing signal W develops at the output $G_1$ of the OR logic 26 in the case where the signal $S_{s1}$ is at a high level and the bleaching timing signal E in the case where the signal $S_{s1}$ is at a low level. A logic product of the signal $Ch_1$ and $G_1$ is the signal $C_1$. In other words, only when a change happens to the segment signal $S_{s1}$, such changes from "L" to "H" and from "H" to "L" allow the coloring timing signal W and the bleaching timing signal E to appear on the signal $C_1$, respectively.

The coloring or bleaching current is supplied to only the segment or segments of which the display state is to be changed, thereby saving power. Meantime, these segments of which the display state is common to a specific display pattern to another are supplied with current by taking advantage of the memory effect inherent to the ECD.

A logical product of the signal $C_1$ and the write timing signal W is the input signal $H_1$ applied to the current value selecting to switch $T_{c1}$. That input signal is connected to the power source $-V_1$ when at a high level. A logical product of the signal $C_1$ and the bleaching timing signal E is the signal $P_1$. A logical sum of the signals $P_1$, $P_2$ and $P_3$ is the input signal K applied to the erase switch $T_E$, which is connected to the power source $+V_2$ when at a high level. Though only the segment signals $S_{s1}$ is shown, other segment signals control $T_{s2}$, $T_{c2}$, $T_{s3}$ and $T_{c3}$ similarly.

Assume now that the segment signal $S_{s1}$ changes from a low level "L" to a high level "H". The single coloring timing signal W appears on the signals $C_1$ and $H_1$, turning on the switches $T_{s1}$ and $T_{c1}$ at the same time. Therefore, the power supply $-V_1$ is conducting to turn on the transistor $T_{r1}$ and turn on the diode D and the transistor $T_{r3}$. If the characteristics of the diode D resembles that of the base junction of the transistor $T_{r3}$, the collector current of the transistor $T_{r3}$ will be equal to the collector current of the transistor $T_{r2}$.

Since as seen from the drawings the collector current of the transistor $T_{r1}$ approximates $V_1/R_1$, the transistor $T_{r3}$ attracts constant current effective to color the segment $S_1$. In the case where both the segment signals $S_{s1}$ and $S_{s2}$ change from a low level to a high level at the same time, the transistors $T_{c1}$ and $T_{c2}$ are turned on so that the constant current $$V_1 \left( \frac{1}{R_1} + \frac{1}{R_2} \right)$$

flows into the counter electrode to color the segment $S_1$ and $S_2$.

The amount of the constant current is varied in accordance with the number of the segments requrring a change in the display state, carrying out the constant current drive in the color mode. Provided that the resistors $R_1$, $R_2$ and $R_3$ are such selected that the reciprocals of these resistors, $1/R_1$, $1/R_2$ and $1/R_3$ are in agreement with rations of areas of their associated segments $S_1$, $S_2$ and $S_3$, the total area of the segments to be colored will be propertional to the constant current value. This makes the amplitude of charge flowing per a unit area constant, unifying the coloring degrees among all display patterns.

Nevertheless, the following fact should be noted in carrying out the constant current drive. Voltage should increase in a sense to supply constant current value when a considerably large current value is fixed or when the coloring degree of the counter electrode is short ($WO_3$ film shows a high resistance in the bleaching mode). If the voltage increases too much, the undesirable side reactions will happen to the cell to degrade the cell performances. To this end the transistor $T_{r3}$ of FIG. 8 is adapted to plung into the saturated region from the active region when the write voltage increases to some extent, thereby carrying out the constant voltage drive. This can be accomplished by a proper selection of the power supply $+V_4$ and the resistor $R_5$. The power supply $+V_4$ should not be too high and more than 3 volts should not be applied inside the cell.

The bleaching is carried out below. When at least one of the segments $S_{s1}$ to $S_{s3}$ changes from "H" to "L", the signal bleaching tuning signal E develops on the output K and at least one of the outputs $C_1$, $C_2$ and $C_3$ which corresponds, to turn on the switch $T_E$ and the segment selection switch (at least one of $T_{s1}$, $T_{s2}$ and $T_{s3}$). As a result, the power supply $+V_2$ is conducting to turn on the transistors $T_{r2}$ and $T_{r4}$. The corresponding segment selection switch is turned on simultaneously. Current, therefore, flows to bleach the corresponding segment. Since the transistor $T_{r4}$ operates within the saturated region, the constant voltage drive (approximately $-V_3$) is carried out.

While only certain embodiments of the present invention have been described, it will be apparent to those skilled in the art that various changes and modifications may be made therein without departing from the spirit and scope of the invention as claimed.

What is claimed is:

1. A display system comprising:
   an electrochromic display having a predetermined number of display segments having at least on and off display states, each of said segments being associated with individual display electrodes and all associated with a counter electrode;
   writing means for applying constant current to said counter electrode to place said display in an on display mode;
   erasing means for applying a constant voltage to said counter electrode to place said display in an off display mode; and
   selection means for connecting the display electrodes associated with display segments desired to be changed to ground, said selection means further energizing said writing means or said erasing means in correspondence with the display mode desired;
   said writing means varying the magnitude of current applied to said counter electrode in correspondence with the numbers of display segments to be placed in an on display state.

2. A display system comprising:

an electrochromic display having a plurality of display segments, each of said segments being associated with individual display electrodes and all associated with a counter electrode;

writing means for applying one of a plurality of constant current levels to said display to place said display in an on display mode;

erasing means for applying a constant voltage to said display to place said display in an off display mode;

means for selecting those display segments desired to be changed and for connecting respective ones of said display segments to a node; and means responding to said connections of each said segment by said writing means for applying one of said plurality of constant current levels to said display counter electrode to supply each segment with a constant current of a predetermined desired magnitude.

* * * * *